Jan. 20, 1970     H. S. JONES     3,490,250
ENHANCED JEWEL STONES AND METHOD OF FORMING SAME
Filed Sept. 19, 1966
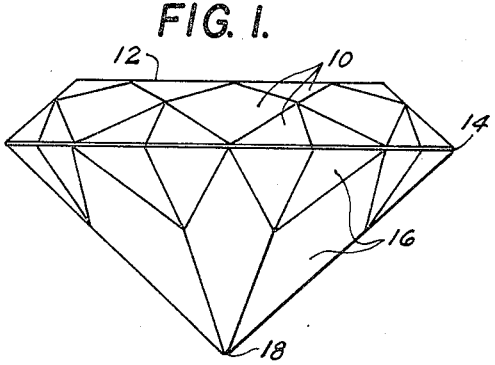
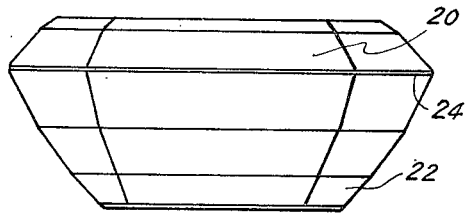
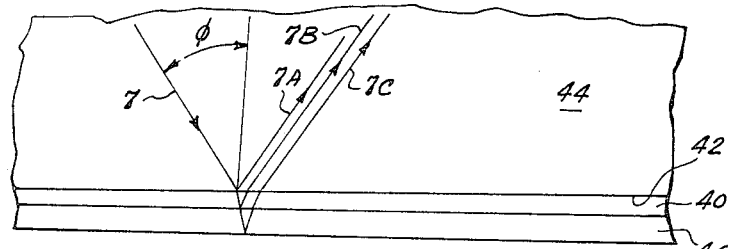
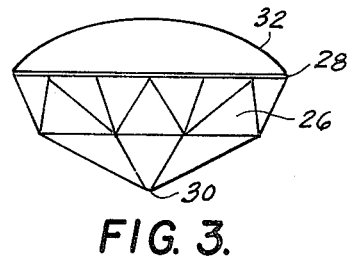
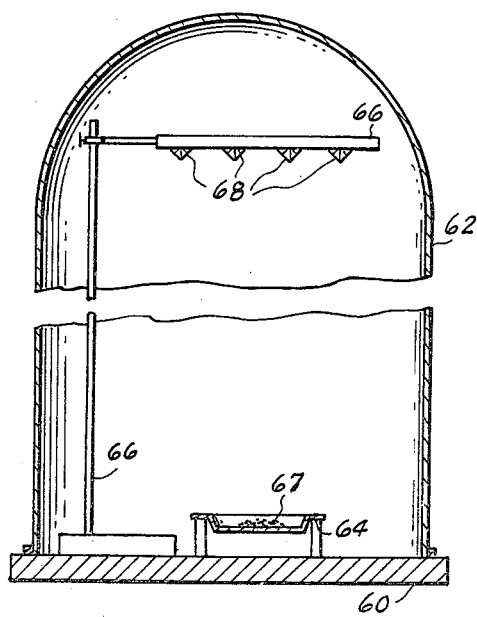
INVENTOR.
HARRY S. JONES
ATTORNEY

United States Patent Office 3,490,250
Patented Jan. 20, 1970

3,490,250
ENHANCED JEWEL STONES AND METHOD
OF FORMING SAME
Harry S. Jones, Monmouth Beach, N.J., assignor to
Chrom-Tronics, Inc., New York, N.Y., a corporation of New York
Filed Sept. 19, 1966, Ser. No. 580,307
Int. Cl. A44c 17/00
U.S. Cl. 63—32                                           9 Claims

ABSTRACT OF THE DISCLOSURE

Jewel stones are enhanced in polychromatic effect (fire) by a plurality of extremely thin coatings deposited on light receptive surfaces of the stone, including a primary coating of a material, e.g. germanium, silicon, or chromium, having a refractive index substantially greater than that of the jewel stone and a secondary coating of a material e.g. silicon oxides, aluminum oxides $Al_2O_3$, or strontium titinate, having a refractive index of a magnitude sufficient to provide a difference in refractivity in the order of 0.5 more from that of the primary coating. The coatings advantageously have a varying thickness that amounts to approximately one-half the wave lengths of visible light.

---

This invention relates to enhanced jewel stone constructions and to a method for effecting such enhancement thereof.

Multifaceted gems of widely varying quality and value have long been favored as articles of personal adornment because of their inherent beauty. Among the various properties that materially contribute to the esthetic beauty of substantially transparent multifaceted gems, whether natural, synthetic, or imitation, are the presence or absence of color therein, the amount of incident light reflected from the surface and interior of the stone which varies with the index of refraction and is commonly called "brilliance" and the presence or absence of polychromatic color effects caused by light dispersion and commonly called "fire."

This invention may be briefly described as an improved method of enhancing multifaceted stones of substantially transparent solid material and of gem configuration by depositing on a surface thereof a multilayer coating formed of a plurality of discrete coatings of varying thickness and selective character to produce polychromatic color effects characteristic of "fire" and the enhanced jewel stone construction resulting therefrom.

Among the advantages of the subject invention is the permitted enhancement of jewel stones of widely varying character, quality and value by the addition of color and polychromatic color effects thereto that appeal to the esthetic senses and provisions of jewel stones of improved beauty and value. A further and singular advantage of the subject invention is the permitted utilization of the water white transparent form of recognized gem minerals such as quartz, sapphire and spinel to form jewel stones of markedly enhanced beauty and value.

The primary objects of this invention are the provision of jewel stones of enhanced character and value and to the provision of a method for effecting such enhancement thereof.

Other objects and advantages of this invention will be pointed out in the following specification and will become apparent to those skilled in this art therefrom and from the attached drawings which show, by way of illustrative example, the principles of this invention as embodied in a presently preferred embodiment thereof.

Referring to the drawings:

FIGURE 1 is a side elevational view of a "brilliant cut" jewel stone.

FIGURE 2 is a side elevational view of a "baguette cut" jewel stone.

FIGURE 3 is a side elevational view of a modified "Dutch rose cut" jewel stone.

FIGURE 4 is a greatly enlarged and idealized cross-sectional view of a portion of a facet of a jewel stone coated in accordance with the principles of this invention.

FIGURE 5 is a schematic view of one form of apparatus employable in the practice of the method of this invention.

Referring to the drawings and particularly to FIGURES 1, 2 and 3 there are illustrated, by way of example, three of the more common and popular gem cuts or configurations that provide multifaceted surfaces for reflection of incident light for jewel stones of the type herein of general concern. The so-called "brilliant cut" illustrated in FIGURE 1, which serves to provide a plurality of facets 10 on the crown intermediate the table 12 and the girdle 14 as well as a plurality of facets 16 intermediate the girdle 14 and the culet 18, is commonly employed for diamonds and other water clear stones and imitations. The modified maguette cut or "step cut" as illustrated in FIGURE 2, which provides multifaceted surfaces 20 and 22 both above and below the girdle 24, is more commonly employed for colored stones but is also used for diamonds and other water clear stones. The modified "Dutch rose cut" as illustrated in FIGURE 3, which provides a multifaceted surface 26 intermediate the girdle 28 and culet 30 in conjunction with a smooth curved and unfaceted upper portion 32, is also widely used for clear stones. As pointed out earlier, jewel stones of the type herein of concern may comprise any substantially transparent solid material ranging from natural gem stones such as quartz, sapphire and spinel to imitation stones of paste or even strontium titanate. Preferably such jewel stones are of the white or water clear variety although certain colored stones of varying hues and depths of coloration can also be enhanced by application of the subject invention.

In its broad aspects the subject invention includes the application of a multilayer coating formed of a plurality of discrete thin coatings of varying thickness and selective character to at least a plurality of the facets of a multifaceted surface of a jewel stone, as for example, to at least a portion of the facets 10 or 16 in the "brilliant cut" and configuration of FIGURE 1, the facets 22 or 20 in the "step cut" configuration of FIGURE 2 or the facets 26 in the "Dutch rose cut" configuration of FIGURE 3. While such coatings can be applied to any of the multifaceted surfaces or in fact to any of the surfaces of a jewel stone with varying effect, it is highly preferred to apply the coatings to multifaceted undersurfaces of a jewel stone which not only results in a greater degree of enhanced effects but also minimizes, if not prevents, deterioration of the applied coatings through abrasive wear or other debilitating usage effects.

As shown in FIGURE 4, a preferred arrangement for multilayer coating comprises a first or prime coating 40 of a material having a relatively high refractive index disposed in interfacial relationship with a facet surface 42 of a jewel stone 44. The refractivity of said prime coating should be of sufficient magnitude as to provide a substantial difference in refractivity over that of the jewel stone itself. In addition thereto such prime coating 40 should desirably have a hardness at least equal to or better than that of the jewel stone and should be reasonably chemically inert. Disposed in continuous interfacial relationship with the prime coating is a secondary coating 46. The material constituting the secondary coating should have a refractivity that is substantially different from that of the prime coating 40 and should be of sufficient magnitude as to provide a difference in refractivity that is at least in the order of .5 or greater. The secondary coating 46 should also desirably be hard, wear resistant and reasonably chemically inert.

Apart from the refractive character of the applied coatings, the desired polychromaticity is also dependent upon the thickness of the coatings and in the variations thereof and in the internal angles of incidence. The primary and secondary coatings 40 and 46 are extremely thin and each has an optical thickness of approximately one-half wave length of visible light which covers the wave length range from 4000 A. in air. For normal perpendicular angles of incidence for green light of a wave length 5200 A. and a refractive index of 2.0 the physical thickness will be equal to the optical thickness divided by the refractive index, that is 5200 A./2×2.0 or 1300 A. which is equivalent to about $5.1 \times 10^{-6}$ inch. Since the 5200 A. wave length will also be selectively reflective at various multiples of one-half wave length the physical thickness may also be $2 \times 5.1 \times 10^{-6}$ inch or $10.2 \times 10^{-6}$ inch or $10.2 \times 10^{-6}$ inch, $15.3 \times 10^{-6}$ inch, or $20.4 \times 10^{-6}$ inch. Experience to date indicates that the higher the refractive index of the materials employed, the thinner will be the coating layer required to produce the enhanced polychromatic effects. Optimum results appear to be obtained when there is a variation in the thickness of the coatings on the facets and experience to date indicates that the degree of polychromaticity varies in proportion to the variations in coating thickness.

While many materials having the general properties set forth above can be employed for the coating layers 40 and 46 preferred materials for the first coating 40 constitute germanium, silicon and chromium having refractive indices of about 3.5, 3.9 and 3.0 respectively in the visible region. Since the bulk of jewel stone materials that will be economically feasible for enhancement by the invention described herein will vary from about 1.5 to 2.0 (or to perhaps 2.4 in the case of strontium titanate or 2.6 in the case of rutile) the requisite substantial differences in the refractive indices between the jewel stone and the first coating 40 are easily attained by use of the above materials. Preferred materials of relatively high refractive index but of lower refractive index than those of primary coating 40 for use as the secondary coating 46 constitute silicon monoxide (SiO), silicon dioxide ($SiO_2$), aluminum oxide ($Al_2O_3$) as will mixed oxides of silicon intermediate the monoxide and dioxide thereof and represented by $SiO_x$ where subscript $x$ statistically represents any number from 1 to 2. The refractive indices of the above noted secondary coating materials are about 2, 1.54, 1.76 and 2.4 respectively and are thus of sufficient magnitude as to provide a substantial difference in refractive index both at the interface of the primary and secondary coatings and of the secondary coating 46 and the air, which of course has a refractive index of unity.

With materials of the character described above a light ray 7 within the material of the jewel stone 44 will be partially reflected as a light ray 7A from the interface between the jewel stone 44 and the primary coating 40; will be partially reflected as a light ray 7B from the interface between the primary and secondary coating layers 40 and 46 and also will be partially reflected as a light ray 7C from the interface between the secondary coating 46 and the surrounding air. As will be apparent to those skilled in the optical arts the above is a simplified explanation of the actual refraction and reflection phenomena involved, but it will be equally apparent from the above that reflective color effects of a polychromatic character will be caused by the interference between the reflected rays 7A, 7B and 7C.

As will now also be apparent, the thicknesses of the primary and secondary layers may each be selected to be compatible with the refractive indices of the materials involved so that polychromatic color effects of desired character will be reflected at a given angle of incidence due to the interference effects described above with the result that a water white jewel may be so coated as to appear to have various colors and/or as to provide pronounced polychromatic color effects in response to variations in the angle of incidence of the white light and commonly characteristic of "fire."

Generally, the more complex the faceting of the jewel stone the greater will be the esthetic effect provided by the subject invention. Referring to FIGURE 1 those skilled in the art of jewel design and cutting will recognize that the greater esthetic effect will result when the thickness of the stone intermediate the girdle 14 and culet 18 is chosen so that some light ray paths include the facets 10 and also at least two approximately opposite facets 16 on the bottom portion thereof. It will also be noted that the materials herein preferred for the secondary coating 46 could be employed for the primary coating and multilayer coatings of more than two lamina can be employed utilizing differing materials for differing effects.

In addition it will often be desirable for employ an outer protective coating that is of a more marked degree of hardness and chemical inertness so as to protect the underlayers from deterioration resulting from abrasion or chemical reactivity. An outer layer of quartz, for example, would afford a high degree of protection and would also possess the heretofore described desirable optical qualities.

FIGURE 5 illustrates the essentials of vacuum deposition type apparatus suitable for effecting application of controlled thickness coating layers to jewel stones. Suitable apparatus is manufactured by the Consolidated Vacuum Corporation of Rochester, N.Y., and includes a base 60, a bell jar or other glass enclosure 62 capable of being evacuated, a heated boat or other vessel 64 for effecting evaporation of the material 67 to be deposited and a support assembly 66 to position the jewel stone 68 or the selected surface thereof to be coated relative to the boat 64. In such apparatus the thickness of the deposited coatings is generally dependent, in part, upon the angular relation of the surface to be coated to the source of material. While such is inherently present for multifaceted jewel stones, means for displacing the jewel stones during deposition can be readily fabricated. In addition to the vacuum evaporation technique described above, chemical deposition, vacuum sputtering and other film coating techniques can be employed in applying the desired coatings to jewel stones in the practice of this invention.

Having thus described my invention, I claim:
1. An enhanced jewel construction comprising:
   a jewel stone
   a thin primary coating of a material having a refractive index substantially greater than the refractive index of the jewel stone disposed on at least a portion of the surface thereof exposed to internally incident light radiation and
   at least one thin secondary coating of a material having a refractive index substantially different from that of the primary coating and of a magnitude sufficient to provide a difference in refractivity in the order of .5 or greater disposed in overlying relation on said primary coating.
2. The enhanced jewel construction as set forth in claim 1 wherein one of said coating materials is selected from the group consisting of germanium, silicon and chromium.
3. The enhanced jewel construction as set forth in claim 1 wherein one of said coating materials is selected from the group consisting of silicon monoxide, silicon dioxide mixed oxides of silicon, aluminum oxide and strontium titanate.

4. The enhanced jewel construction as set forth in claim 1 wherein at least one of said coatings is of varying thickness.

5. The enhanced jewel construction as set forth in claim 1 wherein the thickness of said coatings are in the order of one wave length of light.

6. The enhanced jewel construction as set forth in claim 1 wherein said primary coating material is germanium and said secondary coating material is silicon monoxide.

7. The enhanced jewel construction as set forth in claim 1 wherein said secondary coating material is oxide of silicon represented by the formula $SiO_x$, where $x$ statistically represents any number from 1 to 2.

8. The enhanced jewel construction as set forth in claim 1 wherein said jewel stone is provided with a multiplicity of facets.

9. The enhanced jewel stone construction as set forth in claim 1 wherein a multiplicity of coatings of varying character are disposed in superposed relation on the surfaces of said jewel stone.

References Cited
UNITED STATES PATENTS

| | | | |
|---|---|---|---|
| 484,934 | 10/1892 | Jacobson | 63—32 |
| 2,366,516 | 1/1945 | Geffcken | 117—124 |
| 2,428,868 | 10/1947 | Dimmick | 118—49 |
| 2,478,385 | 8/1949 | Gaiser | 350—164 |

ROBERT PESHOCK, Primary Examiner

GREGORY E. McNEILL, Assistant Examiner

U.S. Cl. X.R.

117—124; 350—164